United States Patent
Zhao et al.

(10) Patent No.: US 10,678,464 B2
(45) Date of Patent: Jun. 9, 2020

(54) METHODS AND APPARATUSES FOR DATA MIGRATION OF A STORAGE DEVICE

(71) Applicant: EMC IP Holding Company LLC, Hopkinton, MA (US)

(72) Inventors: Junping Frank Zhao, Beijing (CN); Layne Lin Peng, Shanghai (CN); Yu Cao, Beijing (CN); Sanping Li, Beijing (CN); Zhe Dong, Beijint (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 82 days.

(21) Appl. No.: 15/455,709

(22) Filed: Mar. 10, 2017

(65) Prior Publication Data

US 2017/0262221 A1    Sep. 14, 2017

(30) Foreign Application Priority Data

Mar. 11, 2016 (CN) .......................... 2016 1 0141843

(51) Int. Cl.
*G06F 3/06* (2006.01)
(52) U.S. Cl.
CPC ............ *G06F 3/0647* (2013.01); *G06F 3/067* (2013.01); *G06F 3/0619* (2013.01)
(58) Field of Classification Search
CPC ....... G06F 3/0647; G06F 3/0619; G06F 3/067
See application file for complete search history.

(56) References Cited

U.S. PATENT DOCUMENTS

| 7,080,225 B1 * | 7/2006 | Todd ...................... G06F 3/061 711/154 |
| 9,507,845 B1 * | 11/2016 | Natanzon ................ G06F 11/16 |
| 2005/0251802 A1 * | 11/2005 | Bozek .................. G06F 9/5077 718/1 |

(Continued)

FOREIGN PATENT DOCUMENTS

| CN | 101907989 A | 12/2010 |
| CN | 102917025 A | 2/2013 |
| CN | 1014424283 A | 3/2015 |

OTHER PUBLICATIONS

First Chinese Office Action issued in CN Application No. 2016101418432 dated Aug. 5, 2019.

*Primary Examiner* — Ryan Bertram
(74) *Attorney, Agent, or Firm* — Brian J. Colandreo; Mark H. Whittenberger; Holland & Knight LLP

(57) ABSTRACT

Embodiments of the present disclosure provide methods and apparatuses for data migration of storage devices including registering at least one executing unit for data migration, each of the at least one executing unit corresponding to description file; extracting and storing information contained in the description file corresponding to each of the at least one executing unit; receiving a data migration request from a user; in response to the data migration request from the user, selecting an executing unit for data migration of the user at least based on part of the stored information contained in the description file; and scheduling an instance of the selected executing unit to execute data migration of the user. The methods or apparatuses according to embodiments of the present disclosure can implement, in a uniform and scalable manner, data migration for various formats, various performance requirements, and application scenarios.

19 Claims, 12 Drawing Sheets

(56) References Cited

U.S. PATENT DOCUMENTS

| | | | |
|---|---|---|---|
| 2006/0130056 A1* | 6/2006 | Bozak | G06F 8/61 717/174 |
| 2008/0060056 A1* | 3/2008 | Li | H04L 63/08 726/3 |
| 2009/0094582 A1* | 4/2009 | Craft | G06F 9/4862 717/127 |
| 2009/0164660 A1* | 6/2009 | Abrams | G06F 9/4856 709/236 |
| 2010/0146033 A1* | 6/2010 | Kaczynski | G06Q 10/04 709/201 |
| 2011/0202640 A1* | 8/2011 | Pillutla | G06F 9/4856 709/221 |
| 2012/0005423 A1* | 1/2012 | Zhuang | G06F 3/0608 711/114 |
| 2012/0089726 A1* | 4/2012 | Doddavula | G06F 9/5072 709/224 |
| 2012/0278801 A1* | 11/2012 | Nelson | G06F 9/45533 718/1 |
| 2013/0085998 A1* | 4/2013 | Barker | G06F 9/5088 707/649 |
| 2013/0124807 A1* | 5/2013 | Nielsen | G06F 11/1438 711/162 |
| 2013/0198564 A1* | 8/2013 | Hasit | G06F 17/30079 714/16 |
| 2014/0115161 A1* | 4/2014 | Agarwal | G06F 9/45558 709/226 |
| 2014/0208315 A1* | 7/2014 | Abali | G06F 9/45533 718/1 |
| 2014/0229944 A1* | 8/2014 | Wang | G06F 9/5088 718/1 |
| 2015/0142858 A1* | 5/2015 | Bryan | G06F 9/50569 707/809 |
| 2015/0356078 A1* | 12/2015 | Kishimoto | G06F 17/30079 707/610 |
| 2016/0105378 A1* | 4/2016 | Xia | H04L 41/0816 370/381 |
| 2016/0330277 A1* | 11/2016 | Jain | H04L 67/1095 |

* cited by examiner

METHODS AND APPARATUSES FOR DATA MIGRATION OF A STORAGE DEVICE

RELATED APPLICATIONS

This application claim priority from Chinese Patent Application Number CN201610141843.2, filed on Mar. 11, 2016 at the State Intellectual Property Office, China, titled "METHOD AND APPARATUS FOR DATA MOVING OF STORAGE DEVICES" the contents of which is herein incorporated by reference in its entirety

FIELD

Embodiments of the present disclosure relate to a storage system, and more specifically relate to methods and apparatuses for data migration for a storage device.

BACKGROUND

In a storage system, a user often intends to perform data migration due to various reasons, i.e., migrating data from one storage device to another storage device. For example, data migration might be performed due to data relocation, data backup (DB), disaster tolerant (DC), rescheduling based on a service level agreement (SLA), data distribution, data aggregation, etc.

Currently, some products or technical solutions for data migration have been proposed. These products and technical solutions are mainly adapted to middle and small-scale data environments or a single application scenario, and have the following drawbacks:

Firstly, these solutions are usually only suitable for some specific application scenarios, migration targets, and migration requirements. For example, in actual applications, there are various data formats, such as files, file systems, magnetic discs, databases, virtual machines, and even containers. However, the existing solutions usually only support one or limited number of data migration formats. As far as migration modes are concerned, the prior art generally cannot support all of the following common modes, e.g., synchronization, asynchronization, layering, data streams, etc. As far as migration targets are concerned, the prior art always has relatively strict restrictions on the source end and the target end, e.g., requiring that the target end and the source end should have the same hardware type and configurations, etc.

Secondly, these existing solutions adopt a design with a close-coupling architecture in the aspect of technical implementations and most of them are based on specific hardware appliances. This results in a poor universality and a difficulty in fast extension.

In a large scale data center or a cloud computing environment, the above drawbacks will bring severe challenges. Therefore, it is desired to provide a uniform and scalable data migration solution.

In the embodiments of the present disclosure, methods and an apparatuses are provided to solve at least some of the above problems.

SUMMARY

Embodiments of the present disclosure provide methods and apparatuses for data migration in a storage system. Hereinafter, a summary of various embodiments will be provided so as to provide basic understanding of some aspects of the various embodiments. The summary is not intended to identify gist of key elements or describe the scope of various embodiments. It's only purpose is to present some concepts in a simplified form as a preamble for subsequent more detailed depiction.

A first aspect of the present disclosure provides a method for data migration, comprising: registering at least one executing unit for data migration, each of the at least one executing unit corresponding to a description file, the description file having a predefined format; extracting and storing information contained in the description file corresponding to each of the at least one executing unit; receiving a data migration request from a user; in response to the data migration request from the user, selecting an executing unit for data migration of the user at least based on part of the stored information contained in the description file; and scheduling an instance of the selected executing unit to perform data migration of the user.

In one embodiment, each of the at least one executing unit is encapsulated into a container.

In another embodiment, the description file may indicate at least one of the following: a type, a capacity, a configuration, a supported data format, a running requirement of the corresponding executing unit; and supportable performance.

In a further embodiment, the data migration request may include indications of a source address and a target address for data migration, and information about at least one of the following items: a performance requirement on the data migration, whether deleting duplications is required during the data migration, whether to perform compression during the data migration and/or a supported compression format; whether to perform encryption in the data migration and/or a supported encryption manner.

In one embodiment, one of the at least one executing unit may be further configured to execute at least one of the following: data extracting, data buffering, data checking, duplicate data deleting, data compressing, data encrypting, and data transmitting.

In another embodiment, selecting an executing unit for data migration of the user at least based on part of the stored information contained in the description file may include: analyzing a data migration request from the user, and determining a executing unit matching the data migration request based on the analyzing and the part of stored information contained in the description file.

In a further embodiment, the method may further comprise: determining an instance of a running executing unit from the executing units matching the data migration request as the most matching executing unit. In another embodiment, selecting an executing unit for data migration of the user at least based on part of the stored information contained in the description file may further include: evaluating resources needed for running of the executing units; and further determining an executing unit matching the data migration request based on the evaluation.

In one embodiment, the method may further comprise at least one of the following: transmitting a data migration response to the user; receiving a query for at least one of a running state and a running log of data migration from the user; displaying at least one of the running state and running log of the user's data migration in response to the query from the user; and receiving, from the user, data to be migrated.

In another embodiment, the method may further include: updating at least one of a progress, a state, a log, a resource usage, and a performance of the scheduled instance of the selected executing unit. In a further embodiment, the method may further include: monitoring at least one of a progress, a state, a log, a resource usage, and a performance of the scheduled instance of the selected executing unit; and increasing, reducing, or changing the scheduled instance of the selected executing unit based on the monitoring.

A second aspect of the present disclosure provides another method for data migration, comprising: transmitting a data migration request to a data migration device so as to cause the data migration device to perform data migration according to a method in the first aspect of the present disclosure.

In one embodiment, the data migration request includes an indication of a source address and a target address for data migration, and information about at least one of the following: performance requirement for the data migration, whether deleting duplication is required during the data migration, whether to perform compression during the data migration and/or a supported compression format; whether to perform encryption in the data migration and/or a supported encryption manner.

In one embodiment, the method may further comprise transmitting at least one of the following to the data migration device: a query for a running state, a running log of data migration; and data to be migrated.

In a further embodiment, the method may further comprise: receiving a running state and/or a running log of the data migration from the data migration device.

A third aspect of the present disclosure provides an apparatus for data migration, comprising a registering unit, a storing unit, a first receiving unit, a scheduling unit, and at least one executing unit, wherein each of the at least one executing unit corresponds to a description file in a predefined format; and each executing unit is configured to perform data migration when being scheduled by the scheduling unit; the registering unit is configured to register the at least one executing unit; the storing unit is configured to extract and store information contained in the description file corresponding to each of the at least one executing unit; the first receiving unit is configured to receive a data migration request from a user; and the scheduling unit is configured to, in response to the data migration request from the user, select an executing unit for data migration of the user at least based on part of the stored information contained in the description file; and schedule an instance of the selected executing unit to perform data migration of the user.

A fourth aspect of the present disclosure provides another apparatus for data migration, comprising a first transmitting unit configured to transmit a data migration request to a data migration device; wherein the data migration device comprises an apparatus according to the third aspect of the present disclosure.

A fifth aspect of the present disclosure provides an apparatus, comprising at least one processor; and at least one memory including computer program codes, wherein the at least one memory and the computer program codes are configured, with the at least one processor, to cause the apparatus to execute the method according to the first aspect of the present disclosure.

A sixth aspect of the present disclosure provides an apparatus, comprising at least one processor; and at least one memory including computer program codes, wherein the at least one memory and the computer program codes are configured, with the at least one processor, to cause the apparatus to execute the method according to the second aspect of the present disclosure.

The methods and apparatuses according to the embodiments of the present disclosure can provide, in a unified and scalable manner, solutions for data migrations with various formats, various performance requirements and application scenarios, and the solutions can be easily deployed and managed.

Although specific embodiments are illustrated by way of example in the drawings, it should be understood that depiction of the specific embodiments herein is not intended to limit the embodiments to the specific forms disclosed.

BRIEF DESCRIPTION OF THE DRAWINGS

The objectives, advantages and other features of the present disclosure will become more apparent from the disclosure and claims below. Here, non-limitative descriptions of example embodiments will be provided, for illustration purposes only, with reference to the accompanying drawings, in which:

DETAILED DESCRIPTION OF EMBODIMENTS

In the description below, many details are described for illustration purposes. However, a person with normal skill in the art will appreciate that embodiments of the present disclosure may be implemented without using these specific details. Therefore, the present disclosure is not intended to be limited to the illustrated embodiments, but will be granted a broadest scope consistent with the principle and features as described herein.

It should be understood that terms "first," "second" and the like are only used for distinguishing one element from another element. In fact, the first element can also be referred to as the second element; and vice versa. In addition, it should also be appreciated that "comprise," "comprising," "include" and "including" are only used for indicating existence of the stated features, elements, functions or components; however, they do not exclude existence of one or more other features, elements, functions or components.

As mentioned above, existing solutions for data migration are generally only applicable to some specific application scenarios, migration targets, and migration needs. In addition, in the aspect of technical implementation, the prior art usually adopts a close-coupling architecture design, and usually are based on specific hardware appliances. This results in poor universality and difficulty in fast extension.

In a large data center or a cloud computing environment, design of a data migration solution will face the following challenges:

1) satisfying needs of a plurality of application scenarios with a single converged architecture, including supporting multiple data sources/formats and common migration modes, thereby avoiding deploying a set of migration system for each specific application or need, respectively.
2) being automatic and manageable. In the prior art, each set of migration system has its own installation, configuration, monitoring, and maintenance manner, and some management functions also need additional hardware. This leads to significant increase in the management and maintenance costs when a plurality of similar systems exist. Therefore, in the converged architecture above, a single management system and automated assistance facilities are needed to coordinate discovery of hardware sources, application, configuration, task submission, and life cycle management, etc.
3) being scalable and satisfying a service level quality standard (SLA). When the data flow increases and task changes, the data migration system should be horizontally scalable, and can be deployed flexibly and fast, so as to satisfy an agreed SLA, e.g., performance indexes (e.g., MB/s, IOPS), migration index (e.g., RTO, RPO), and cost control (e.g., TCO).

In order to solve at least some of the above problems and/or achieve at least part of the above requirements, embodiments of the present disclosure propose a method and apparatus for data migration in a storage system.

Figure 1A:
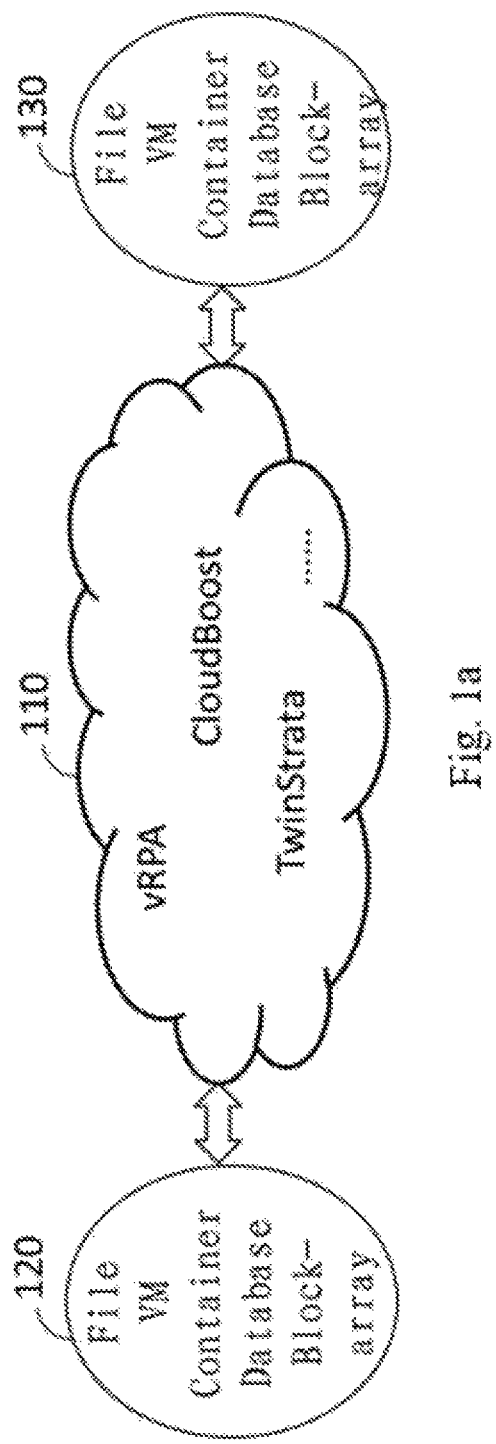
FIG. 1a illustrates a schematic diagram of a frame for data migration according to an embodiment of the present disclosure.

Embodiments of the present disclosure provide a uniform, scalable, and easily operable data migration frame 110, as shown in FIG. 1a. The framework 110 may support migration of various data from a device 120 to a device 130. The device 120 and the device 130 may be local storage devices or cloud storage devices. The framework 110 comprises a centralized control plane and a pluggable data plane. The data plane can sufficiently utilize existing data migration technologies (e.g., vRPA, CloudBoost, TwinStrata, etc.) and meanwhile is also open to new data migration technologies developed in the future. These different data migration technologies may be inserted into an apparatus according to an embodiment of the present disclosure as needed. For example, each data migration technology may be inserted into a common pluggable engine layer in the apparatus as a container or a VMWare Integrated Container (VIC) container. At the control plane, embodiments of the present disclosure establish a layer stack that is capable of automatic matching and automatic scaling. This embodiment can find a most matching data migration technology based on the stored knowledge and task information input, and/or SLA, etc. Therefore, embodiments of the present disclosure can hide internal complexity (e.g., resource evaluation and selection) so as to provide a solution which is easier to use; in addition, the apparatus can be scaled fast by inserting a new data migration technology.

Figure 1B:
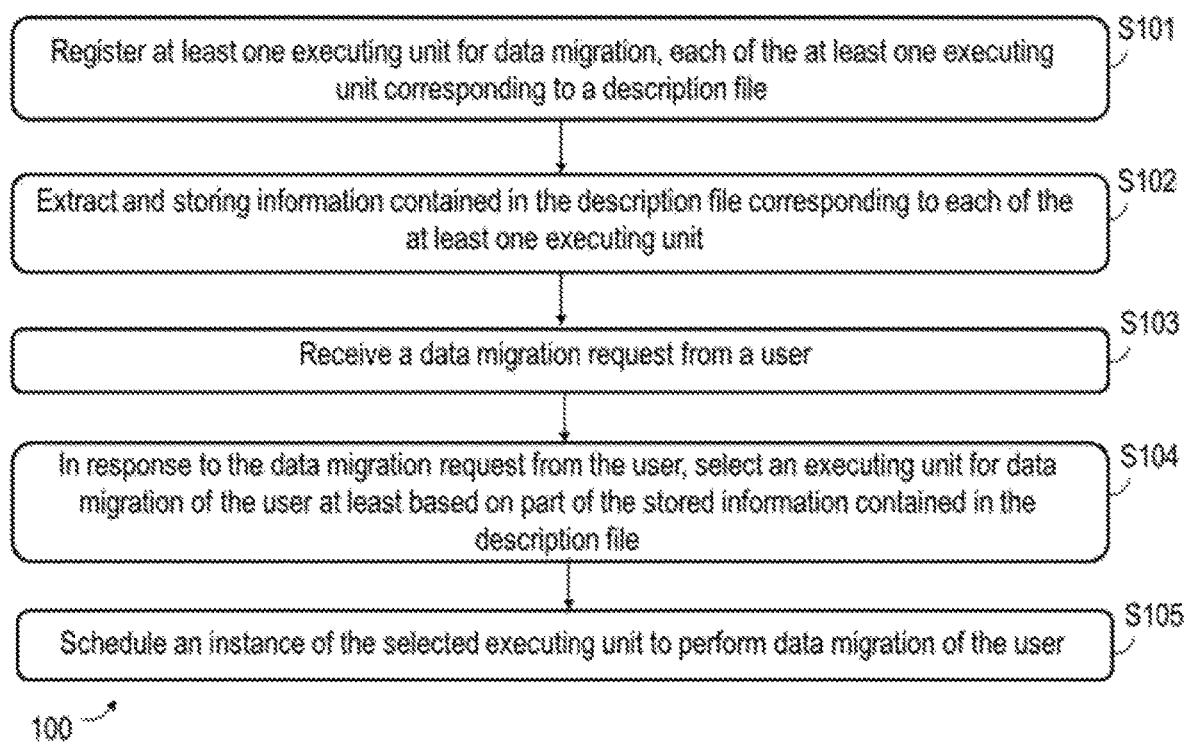
FIGS. 1b-1c illustrate an example flow diagram of a method for data migration according to an embodiment of the present disclosure.
Figure 1C:
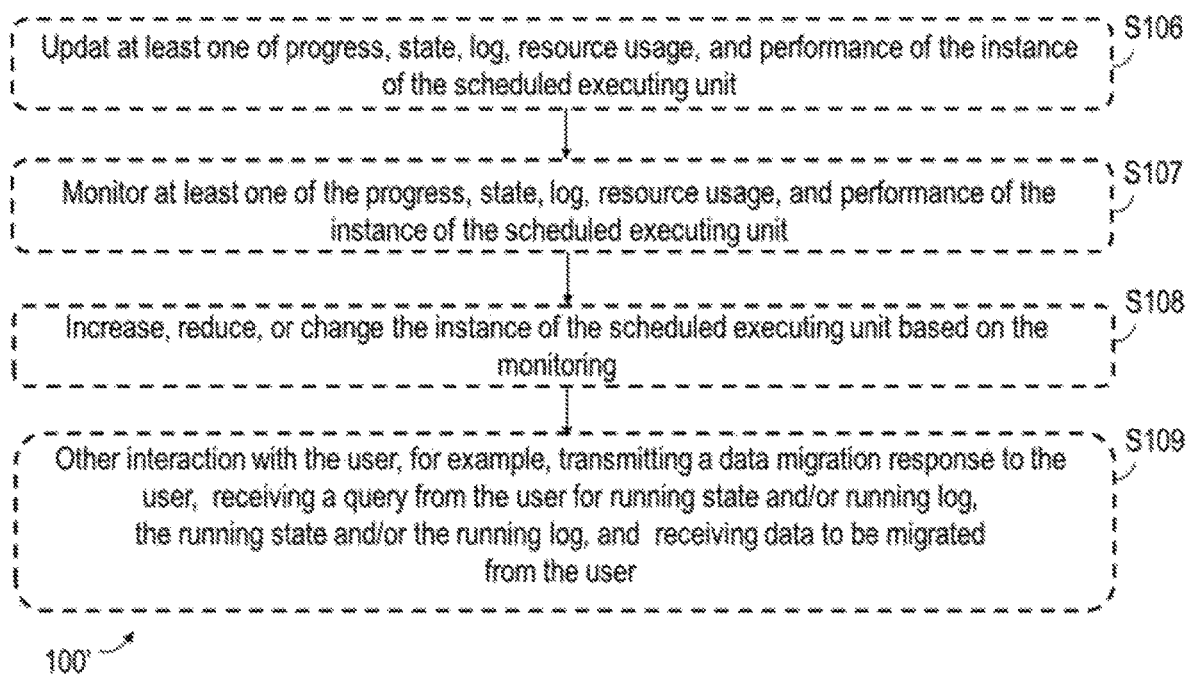

FIGS. 1b-1c illustrate an example flow diagram of a method 100 for data migration. The method 100, for example, may be used in the data migration frame 110 in FIG. 1a. The data migration may be performed between same or different storage devices, i.e., the source device and the target device for data migration may have the same or different types. For example, the data migration may be performed between a local storage device and a cloud storage device, or between cloud storage devices. The embodiments of the present disclosure are not limited to any specific type of source storage device and target storage device.

As illustrated in FIG. 1b, the method 100 comprises: at block S101, registering at least one executing unit for data migration, each executing unit in the at least one executing unit corresponding to description file; at block S102, extracting and storing information contained in the description file corresponding to each executing unit in the at least one executing unit; at block S103, receiving a data migration request from a user; at block S104, in response to the data migration request from the user, selecting an executing unit for data migration of the user at least based on part of the stored information contained in the description file; and at block S105 scheduling an instance of the selected executing unit to perform data migration of the user.

The executing unit registered in S101 may be an executing unit using any existing data migration technologies, e.g., RPA, CloudBoost, TwinStrate, etc., or may be an executing unit using a newly developed data migration technology. Embodiments of the present disclosure are not limited to the technology specifically used by the executing unit.

In one embodiment, the registration in S101 may comprise registering the at least one executing unit through a REST application program interface (API). However, embodiments of the present disclosure are not limited thereto; instead, the registration may be performed in any appropriate manner.

In one embodiment, each of the at least one executing unit may be encapsulated into a container, so as to register the container at S101. A typical container is Docker. However, embodiments of the present disclosure are not limited thereto.

In another embodiment, the description file of the executing unit indicates at least one of the following: type, capacity, configuration, supported data format, running requirement of a corresponding executing unit, and performance that can be provided by the corresponding executing unit. This enables selection of a most matching executing unit for a specific data migration task.

The embodiments of the present disclosure are not limited to any specific format of the description file. Just as an example, the file format may be a JSON file format. For example, the description file may describe the capacity of an executing unit in the following format:

.format=container RPO=1Min Mode=online|async compression=Yes, Lz4, checksum=FarmHash;
and/or, the deployment and resource requirement of the executing unit may be described in the following format:
staging = .cpu=1, .mem=2GB. .net=10Gb .disk=100GB;
processing .cpu=4 .mme=2GB .net=10Gb. .disk=10GB
APIs = (start, show-status, add-instance, stop).

Below is an example of the description file:

{
"worker_name": "type1",
"support_data_src": ["file", "MySQL DB", "VMFS"],
"mode": ["sync", "async", "streaming"],
"data_features" : {
"data_crc": "yes",
"data_dedup": "yes",
"data_compression": "yes"
},

```
"resource": {
    "type": "vm",
    "cpu_core":"2",
    "mem": "2GB",
    "drive_ssd":"10GB",
    "drive_hd":"100GB",
    "network": "100MB/s"
    "agent":"no"
},
"service_api": {
    "service_port": "3636",
    "health_check_port": "12315"
}
"sla_per_instance": {
    "bandwidth": "100MB/s",
    ...
}
}
```

At S102, the description file may be read, information therein may extracted and the information may be stored in a format identical to or different from the description file. For example, the information may be stored in a file, a database, or a lookup table. Embodiments of the present disclosure are not limited to any specific form of storage.

In one embodiment, the data migration request from a user as received in S103 includes an indication of a source address and a target address for data migration which may be, for example, IP addresses, or accounts, or paths, volID, or CID, etc. of the source and target storage devices.

In another embodiment, the data migration request may also include information about at least one of the following: performance requirement on the data migration, whether deleting duplications being required in the data migration, whether to perform compression during the data migration and/or the supported compression format; whether to perform encryption in the data migration and/or the supported encryption manner. Among them, the first item enables the method 100 to select an executing unit most matching the performance required by the user, while the second to fourth items enable the method 100 to select an executing unit corresponding to processing capability with respect to whether extra data processing is needed during the data migration process. Just as an example, the performance requirement may be a bandwidth, a time delay, and input output per second (IOPS), etc.

In an embodiment, the at least one executing unit may have different processing capabilities. For example, some of the executing units may also be configured to execute at least one of the following: data extracting, data caching, data checking, duplicate data deleting, data compressing, data encrypting, and data transmitting. Therefore, the method 100 can allow the user to provide a requirement with respect to data processing, and select an appropriate executing unit therefor.

In an embodiment, at S104, selecting an executing unit for data migration of the user at least based on part of the stored information contained in the description file may comprise: analyzing a data migration request from the user, and determining an executing unit matching the data migration request based on the analysis and the part of stored information of the description file.

In one embodiment, S104 may comprise: evaluating resources required by an executing unit based on the description file: and determining an executing unit matching the data migration further based on the evaluating.

In another example, the matching executing unit may be an executing unit that can satisfy a performance requirement indicated in the data migration request from the user or an executing unit that have a processing capability indicated in the data migration request. In one example embodiment, S104 may further comprise: preferably selecting an instance of a running executing unit, i.e., determining an instance of a running executing unit in the executing units matching the data migration request as the most matching executing unit. This enables reuse of the running resources.

In another embodiment, at S105, scheduling an instance of the selected executing unit to perform data migration of the user may comprise: transmitting a request for running the executing unit to a running environment, obtaining a resource for running the executing unit from the running environment, and running the instance of the selected executing unit on the resource.

In an embodiment of the present disclosure, the method 100 may further comprise one or more of operations 100' illustrated in FIG. 1c, which may be performed in addition to S101-S105.

In particular, in an embodiment, at S106, at least one of a progress, a state, a log, a resource utilization, and performance of the scheduled instance of the selected executing unit may be updated. The updating result may be, for example, queried by the user, displayed, or used in scheduling.

As shown in FIG. 1c, in another embodiment, the method 100 may further comprise: at S107, monitoring at least one of the progress, state, log, resource utilization, and performance of the scheduled instance of the selected executing unit; and at S108, adding, reducing, or changing the scheduled instance of the selected executing unit based on the monitoring. For example, current performance may be compared with the SLA to determine whether the instance of the executing unit satisfies the requirement, and for example, a new instance of the executing unit may be run when value of some performance parameter is lower than a predetermined threshold. For example, when only 30% of the capacity of the memory is available, and/or when the IOPS drops by 50%, a new instance may be run. This enables the method 100 to be adapted to a changing running environment and satisfies the user's performance requirement.

Also optionally, in another embodiment, the method 100 may further comprise another interaction S109 with the user, e.g., the method 100 may include at least one of the following: transmitting a data migration response to the user; receiving the user's query for a running state and/or a running log of the data migration; displaying the running state and/or running log of the user's data migration in response to the user's query; and receiving, from the user, data to be migrated.

For example, in one embodiment, the method 100 may receive to-be-migrated data from a user, and migrate the data to a target storage device according to an indication in the data migration request. In another embodiment, the method 100 may also read data according to a source storage address in the data migration request and store the data in the target storage device. In other words, there may be the following two manners of extracting data from the data resource: push (writing data into the migration system) and pull (the migration system voluntarily reads data from the data source). In the aspect of specific implementation, executing of some migrations may require cooperation from a specific client (which may be referred as a proxy, installed at the data source or data target end). The client may be used for: 1) monitoring data change constantly, and maintaining a control communication with the migration system; 2) for the sake of performance or reliability, the client may concurrently run with multiple threads, and may perform necessary pre-processing, e.g., performing data check, data compression, duplicate data deletion, etc., before delivering the data to the migration system. In other words, part of the functions to be performed in an migration executing module is advanced. It should be noted that the client is not a must, depending on specific implementations of various executing modules. The embodiments of the present disclosure have no limitation thereto.

Figure 2A:
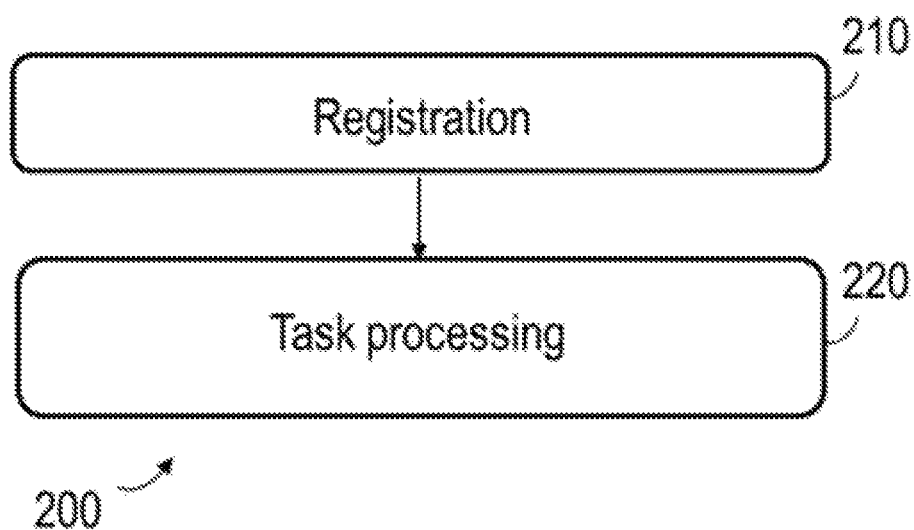
FIGS. 2a-2c illustrate another example flow diagram of a method for data migration according to an embodiment of the present disclosure.
Figure 2B:
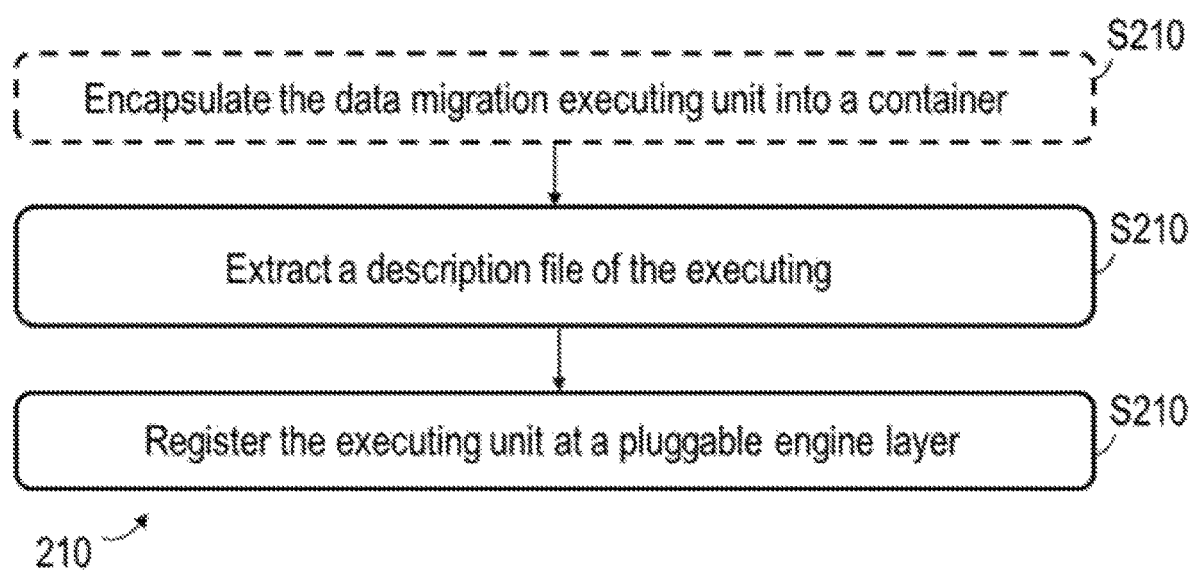
Figure 2C:
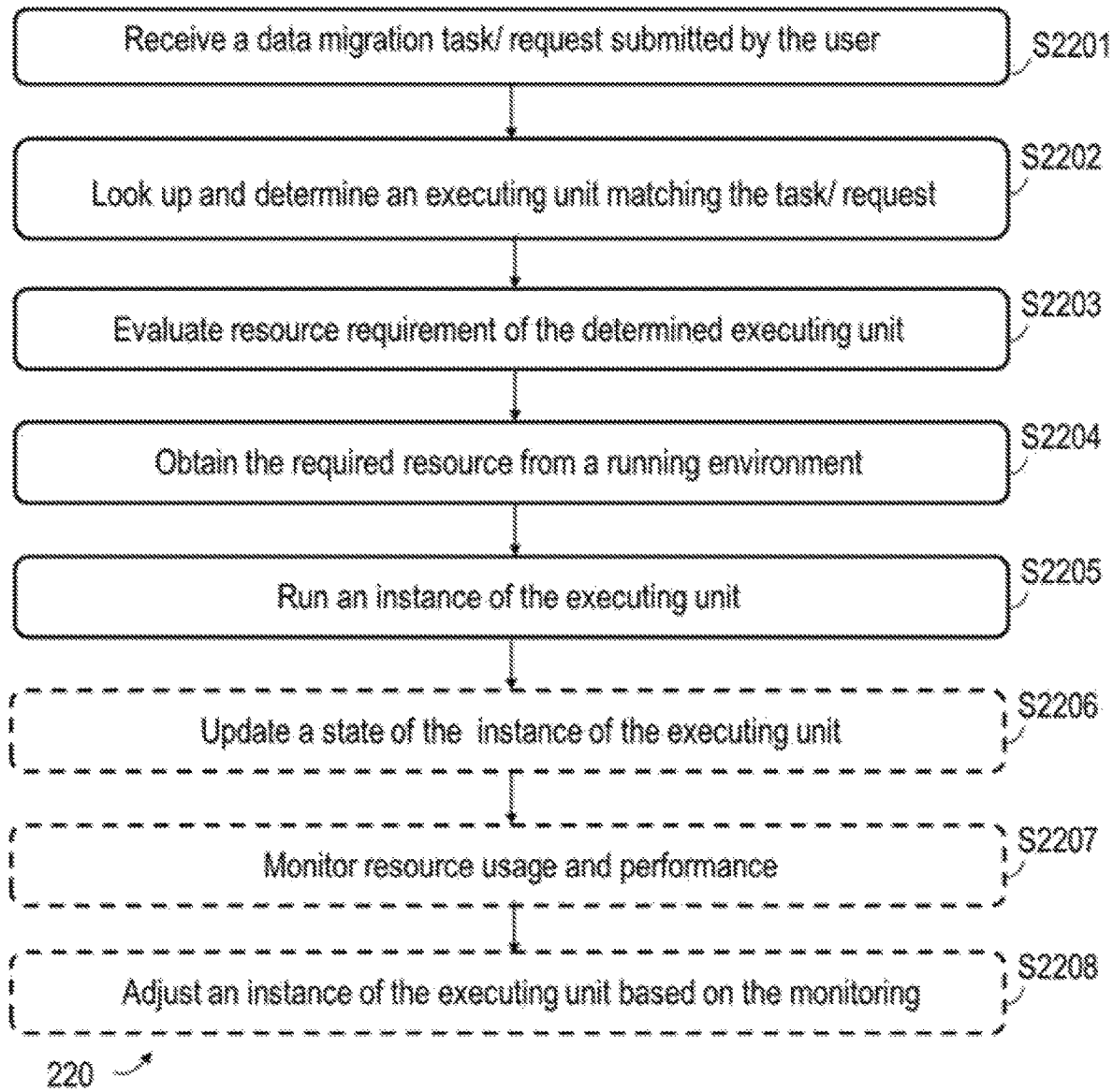

FIGS. 2a-2c illustrate an example flow diagram of another method 200 for data migration. Particularly, FIG. 2a illustrates that the method comprises a registration flow 210 and a task processing flow 220. FIG. 2b illustrates an example operation of the flow 210 for registering a new executing unit. As illustrated in FIG. 2b, at S2101, the data migration executing unit is encapsulated into a container, e.g., Docker. At S2102, a description file of the executing unit is extracted, which description file may be, for example, a .JSON file. At S2103, the executing unit is registered at a pluggable engine layer. The pluggable engine layer is a common layer for registration of various executing units. The registration information and the information about the description file may be stored in a database (or a lookup table/file) at S2104.

It can be understood that when the executing unit used in the method has been encapsulated into a container in advance, the operation of S2101 may be omitted.

In one embodiment, the operations of S2102 and S2104 may be identical to block S102 of the method 100, while the operation of S2103 may be identical to block S101 of the method 100.

FIG. 2c illustrates a schematic flow 220 in the method for processing a task requested by the user. As illustrated in FIG. 2c, at S2201, a data migration task/request submitted by the user is received. The request may be similar to what is described with reference to method 100, and thus will not be detailed any more.

At S2202, looking up and determining an executing unit matching the task/request; and at S2203, evaluating a resource requirement of the determined executing unit. At S2204, obtaining the required resource from a running environment/system resource pool. In one embodiment, the system resource pool provides a hardware/software environment required by the running, e.g., a virtual machine instance and a CPU, a memory, a magnetic disk, a network, and an operating system; and at S2204, a data migration apparatus can obtain, from the running environment/system resource pool, an interface for accessing the resource e.g., an IP address, account information, etc. At S2205, running the instance of the executing unit using the obtained resource. For example, at S2205, a migration scheduling layer of the data migration apparatus installs the selected executing unit (migration module) in the running environment, and then starts and initializes the instance as required (e.g., sequence, environment variables as set, etc.).

In one embodiment, the operation of S2203 may also be executed in S2202, i.e., considering the evaluation of resources when determining the executing unit. In another embodiment, the operations of S2202 and S2203 may be identical to S104 in method 100, or may be part the S104. In another embodiment, the operations of S2204 and S2205 are identical to the operation of S105 in the method 100, or may be part thereof.

As illustrated in FIG. 2c, the example method may further comprise S2206, in which a state of the instance of the executing unit is updated, e.g., one or more of its running state, performance, log, resource use, etc. may be updated.

In an embodiment, at S2206, an instance of the executing unit may be registered with the migration system to record its information, including which migration module corresponds to which virtual machine, how many instances are successfully launched, what interfaces is accessible externally (generally an IP address plus a port), etc. Such information will be updated into a database for subsequent query and constant state update. In an embodiment, the operation may be identical to the operation of S106.

In another embodiment, the example method may also comprise S2207 where resource usage and performance of the executing unit are monitored, and S2208 where the instance of the executing unit is adjusted based on the monitoring which includes adding new or more instances. For example, at S2207, running condition of the instance may be monitored continuously and periodically, the running condition mainly including a state of the running (normal, failed, local failure, etc.), performance indexes (MB/s, read write delay, etc.) and resource consumptions (CPU, memory, magnetic disk, network), etc.), and such information may be aggregated and directed into a database or directly exported to display on a management interface. When an abnormal situation is detected such that the service level cannot be guaranteed, intervening processing may be performed at S2208. For example:

1) instance failure, i.e., inaccessible to the external. At this point, two policies may be predefined. One is re-starting the instance; the other one is killing the instance and re-applying a new resource to replace the failed instance.
2) performance abnormality of an instance: for example, rapid increase of amount of the imported data, or too rapid consumption of resources, or simultaneous occurrence of both, finally cause degradation of performance indexes. Then, the adopted policy may be increasing response level in order, depending on the degradation degrees. For example, when the performance drops by 20% and it lasts for 3 minutes, more instances will be launched on the existing resource (e.g., a virtual machine); when the performance drops by 50% and it lasts for 10 minutes, more running resources may be applied from the resource pool, with instances added thereon. The amount of resources being applied depends on the degradation degree.

In one embodiment, operations of S2207 and S2208 may be identical to S107 and S108 of the method 100.

Figure 3:
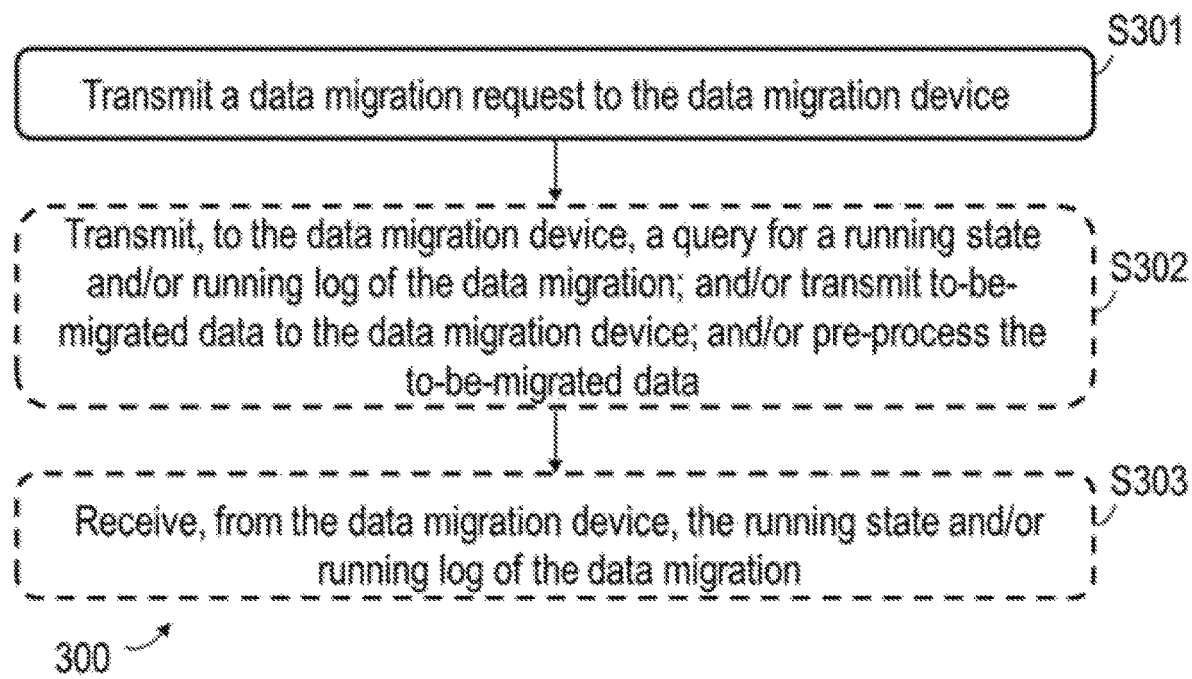
FIG. 3 illustrates an example flow diagram of another method for data migration according to an embodiment of the present disclosure.

FIG. 3 illustrates a method 300 for data migration. As illustrated in FIG. 3, the method 300 comprises step S301, wherein a user transmits a data migration request to a data migration device, so as to cause the data migration device to perform data migration according to any of method 100 or method 200.

As described with reference to FIG. 1 and the method 100, in one embodiment, the data migration request may comprise an indication of a source address and a target address for data migration, and information about at least one of the following: performance requirement for the data migration, whether deleting duplications being required in the data migration, whether to perform compression during the data migration and/or the supported compression format; whether to perform encryption in the data migration and/or the supported encryption manner.

In another embodiment, optionally, the method 300 may further comprise S302, where the user transmits, to the data migration device, a query for a running state and/or running log of the data migration; and/or transmits to-be-migrated data to the data migration device; and/or pre-processing the to-be-migrated data.

Optionally, in another embodiment, the method 300 may also comprise S303 in which the user receives, from the data migration device, a running state and/or running log of the data migration.

Hereinafter, a structure of an apparatus 400 for data migration will be described with referenced to FIG. 4. The apparatus 400 is adapted to perform data migration in various formats between any storage devices. For example, the storage device may be a local storage device or a cloud storage device. Moreover, a source storage device and a target storage device may be of different types.

The apparatus 400 may execute the method 100 described with reference to FIG. 1 or the method 200 described with reference to FIGS. 2a-2c, but not limited to executing the method 100 or 200. Likewise, the method 100 or 200 may be executed by the apparatus 400, but not limited to being executed by the apparatus 400. For example, at least some operations of the method 100 or 200 may be performed by other apparatus.

Figure 4:
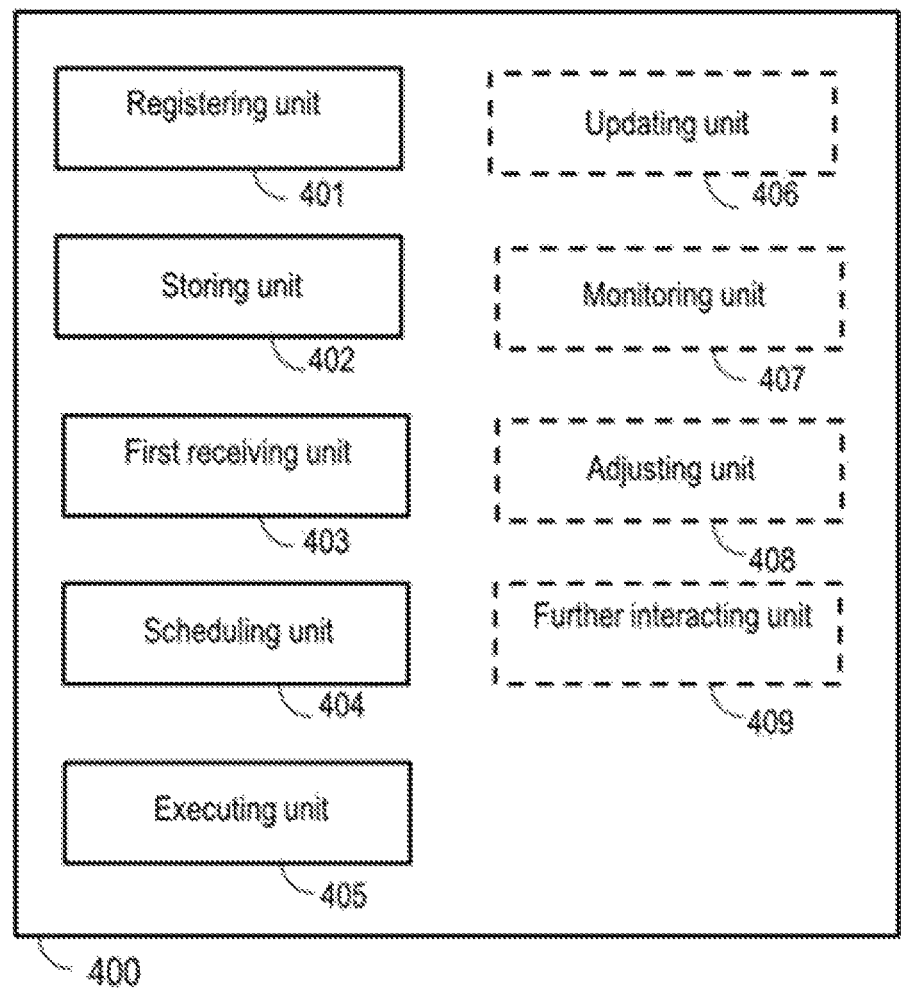
FIG. 4 illustrates an example structural diagram of an apparatus for data migration according to an embodiment of the present disclosure.

As illustrated in FIG. 4, the apparatus 400 comprises a registering unit 401, a storing unit 402, a first receiving unit 403, a scheduling unit 404, and at least one executing unit 405, wherein each of the at least one executing unit (405-1, 405-2, 405-3) corresponds to description file; and each executing file is configured to perform data migration when being scheduled by the scheduling unit. The registering unit 401 is configured to register the at least one executing unit; the storing unit 402 is configured to extract and store information contained in the description file corresponding to each of the at least one executing unit; the first receiving unit 403 is configured to receive a data migration request from a user; and the scheduling unit 404 is configured to, in response to the data migration request from the user, select an executing unit for data migration of the user at least based on part of the stored information contained in the description file; and schedule an instance of the selected executing unit to perform data migration of the user.

In an embodiment, the registering unit 401, storing unit 402, first receiving unit 403, scheduling unit 404, and the at least one executing unit 405 of the apparatus 400 may perform the functions of blocks S101-S105 of the method 100, respectively. Therefore, corresponding operations and features described with reference to FIG. 1 and the method 100 also apply here, and thus will not be detailed.

For example, each (e.g., 405-1, 405-2, 45-3) of the at least one executing unit 405 may be encapsulated into a container, such as Docker or VIC.

In an embodiment, some executing units may be further configured to execute at least one of the following: data extracting, data caching, data checking, duplicate data deleting, data compressing, data encrypting, and data transmitting.

In another embodiment, the description file of the executing unit 405 may indicate at least one of the following: type, capacity, configuration, supported data format, running requirement of the corresponding executing unit, and performance that can be provided by the corresponding executing unit. Examples of the formats of the description file have been provided in conjunction with the method 100, and will not be repeated here.

In another embodiment, the data migration request may comprise an indication of a source address and a target address for data migration, and information about at least one of the following items: performance requirement on the data migration, whether deleting duplications being required in the data migration, whether to perform compression during the data migration and/or the supported compression format; whether to perform encryption in the data migration and/or the supported encryption manner.

In one embodiment, the scheduling unit 404 may be further configured to analyze a data migration request from the user, determine an executing unit matching the data migration request based on the analysis and stored description file, and schedule an instance of the determined executing unit to perform the data migration. In a further embodiment, the scheduling unit 304 may be further configured to: determine an instance of a running executing unit in the executing units matching the data migration request as the most matching executing unit. In a further embodiment, the scheduling unit 404 may be further configured to evaluate resources needed for running of the executing units; and determine an executing unit matching the data migration further based on the evaluating.

In one embodiment, the apparatus 400 may further comprise an updating unit 406 configured to update at least one of: progress, state, log, resource utilization, and performance of the scheduled instance of the selected executing unit.

In a further embodiment, the apparatus 400 may further comprise: a monitoring unit 407 configured to monitor at least one of: the progress, state, log, resource utilization, and performance of the scheduled instance of the selected executing unit; and an adjusting unit 408 configured to add, reduce, or change the scheduled instance of the selected executing unit based on the monitoring.

In one embodiment, the updating unit 406, monitoring unit 407, and the adjusting unit 408 may be configured to execute operations of S106-S108 of the method 100, respectively; therefore, the depictions provided in conjunction with S106-S108 are also applicable here, and will not be detailed.

Optionally, the apparatus 400 may further comprise a further interacting unit 409 for interacting with the user. For example, the further interacting unit 409 may comprise at least one of the following: a first transmitting unit configured to transmit a data migration response to the user, a second receiving unit configured to receive the user's query for a running state and/or a running log of the data migration, a display unit configured to display the user's running state and/or the running log in response to the user's query; and a third receiving unit configured to receive the to-be-migrated data from the user.

Figure 5:
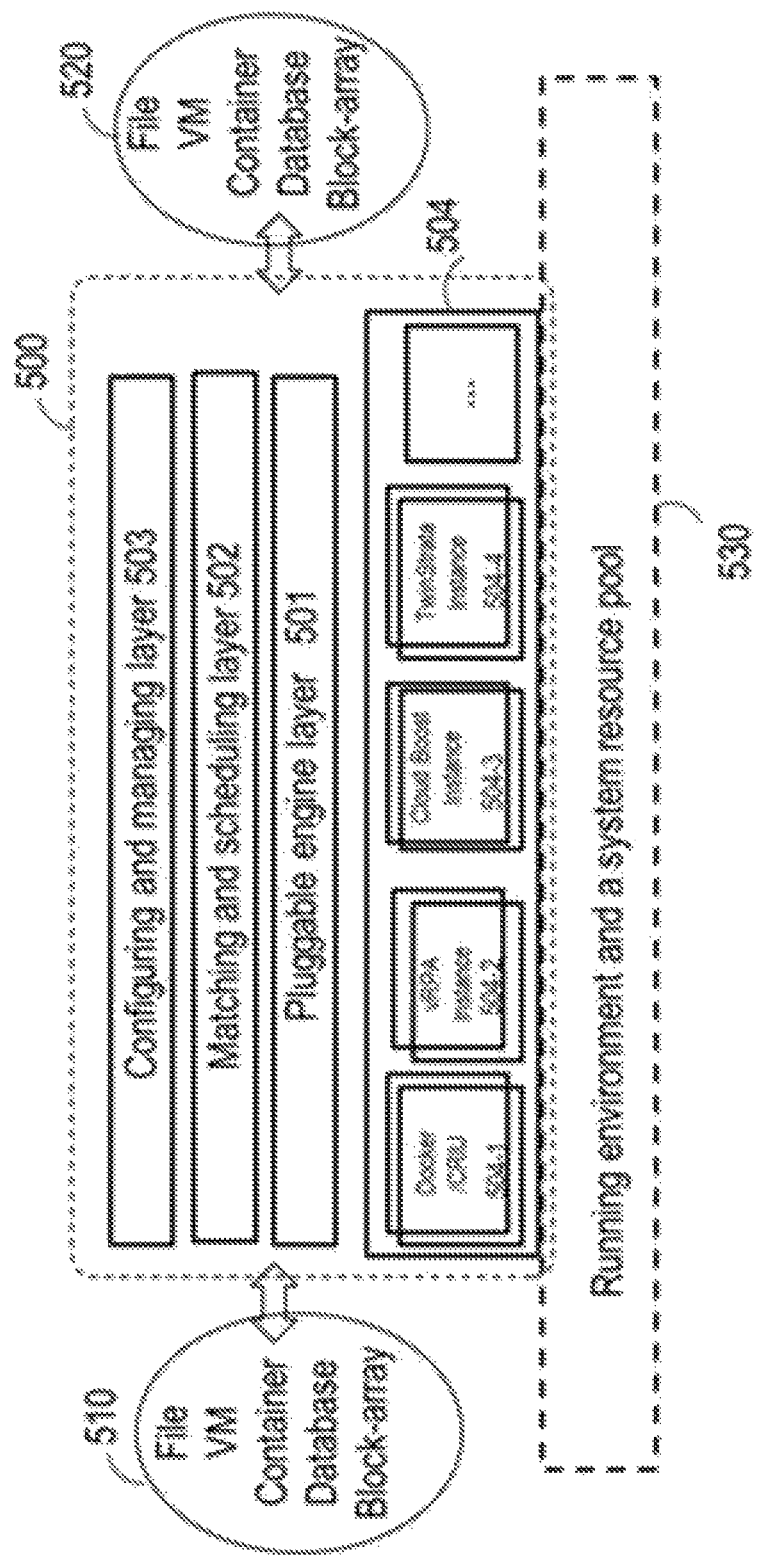
FIG. 5 illustrates another example structural diagram of an apparatus for data migration according to an embodiment of the present disclosure and its operating environment.

FIG. 5 illustrates another example structural diagram of an apparatus 500 for data migration and an example application circumstance. The storage device 510 at the left side of the figure and the storage device 520 at the right side may be a source storage device or a target storage device for data migration. As illustrated in the figure, both the source storage device and the target storage device may comprise various types of data. 530 at the lower part of the figure is an example of the running environment and a system resource pool for the apparatus 500. A typical running environment may be IaaS (Infrastructure as a Service) or PaaS (Platform as a Service). These "As a Service" all provide an interface API of access as demand. Such IaaS/PaaS provide a host/VM (virtual machine) needed for system running, including a CPU, a memory, magnetic disk, network, and an operating system, etc. According to an embodiment of the present disclosure, the executing module can run as a package in a manner of Docker container and has a good compatibility. It may support dominant IaaS in the current market, such as Amazon AWS, Microsoft Azure, Google Cloud Engine, EMC VirtuStream, VMWare vCloud Air, OpenStack, etc., or PaaS such as CloudFoundry, Mesos, Kubernetes, etc.

As illustrated in FIG. 5, the apparatus is applicable for performing data migrations of various formats between any storage devices. For example, the storage device may be a local storage device or a cloud storage device. Moreover, the source storage device and the target storage device may be of different types.

As illustrated in FIG. 5, the apparatus 500 comprises a pluggable engine layer 501, a matching and scheduling layer 502, a configuring and managing layer 503, and an executing unit 504. FIG. 5 illustrates 4 different kinds of executing units 504-1, 504-2, 504-3, and 504-4 using the prior art. However, embodiments of the present disclosure are not limited to the number and types of the executing units illustrated in the figure. As illustrated in the figure, different executing units may be packaged into a container, e.g., Docker or VIC, respectively.

The pluggable engine layer 501 registers a plurality of executing units. The pluggable engine layer is a service extracting layer that may act as a bridge between the scheduling unit and the executable unit. For example, the pluggable engine layer may register each executing unit through RESRAPI and record its capability and API. In an embodiment, the function of the pluggable engine layer 501 may be identical to the registering unit 401 in the apparatus 400.

In an embodiment, the matching and scheduling layer 502 may perform automatic matching, automatic scheduling and automatic adjustment (e.g., automatic extension) of the executing unit. In a further embodiment, the matching and scheduling layer 502 may analyze the user's requirement based on user input data, or obtain types and running environments and the like of the source/target storage device, and perform automatic matching at least based thereon. For example, the scheduling unit may consider a data format indicated in the user request, PRO needs, synchronization/asynchrony, or a combination thereof. In another example, the matching and scheduling layer 502 may detect the environment of source/target/platform, e.g., operating system, Docker environment, hardware resource, product manufacturer and/or model. In another example, the scheduling unit may perform resource assessment.

In another embodiment, the matching and scheduling layer 502 may run the API by invoking the executing unit so as to launch the container or VIC of the corresponding executing unit. The scheduling might need, but not necessarily, install a proxy in the source and/or target storage devices.

In a further embodiment, the matching and scheduling layer 502 may also monitor a state, progress, log, and etc. of executing unit and adjust the scheduling result. The monitoring, for example, may be performed by invoking the API of the executing unit. The adjustment may comprise extending scheduled instances of the executing unit according to a result of the monitoring of the resource usage and/or performance.

In another example, the matching and scheduling layer 502 may perform functions identical to the scheduling unit 404 of the apparatus 400.

The configuration and management layer 503 may provide a centralized management interface, for example, it may comprise a dashboard that may display a running state and a log, etc. For example, the interface may allow the user to submit a task request, a task progress query, etc., and/or may provide authentication information.

In one embodiment, within one executing unit 504, a plurality of functional sub-modules may exist, and each sub-module may be packaged and run in a manner of a container, and may be extended independently (i.e., a plurality of running instances). A typical functional sub-module includes, but not limited to:

Data extracting: importing data from the data source (by pull or push);

Data cache: temporarily store data, e.g., saved in a memory, magnetic disk, or a multi-duplicate mirror;

Data check (generally generate a check value in a fixed length for the extracted data and save the check value, so as to prevent data integrity of the data from being affected due to occurrence of software/hardware failure during the transmission or processing procedure);

duplicate data delete (if identical data contents are found, those duplicate data blocks are not saved or transmitted);

data compression;

data encryption;

data transfer/transmission.

Figure 6:
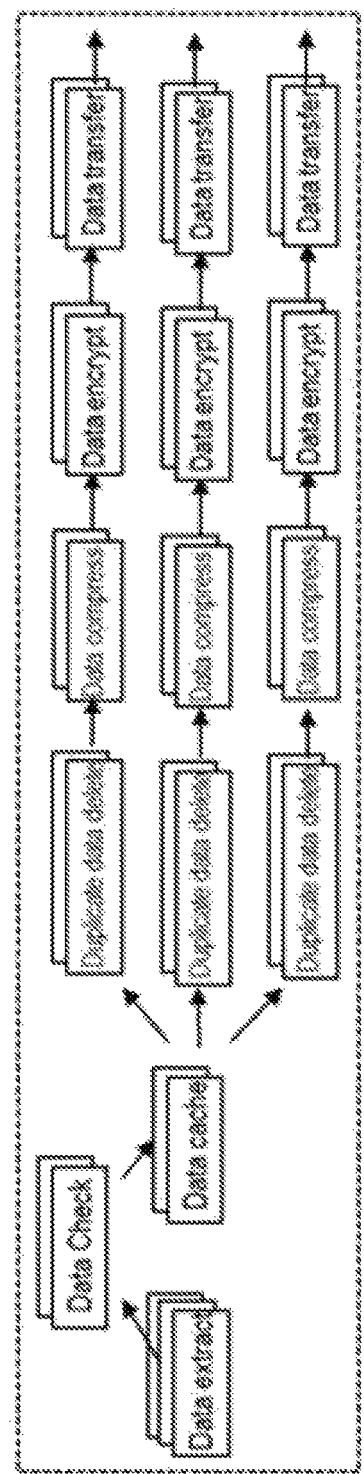
FIG. 6 illustrates an example structural diagram of functional sub-modules of an executing unit according to an embodiment of the present disclosure.

The sub-modules may have a specific data flow relationship therebetween. FIG. 6 illustrates an example of multiple sub-modules and the data flow therebetween. However, as can be understood by those skilled in the art, in other embodiments, less or more or different sub-modules may be implemented in the executing unit 504 than what is shown in FIG. 6, and the data flow therein may be different from what is shown in FIG. 6.

Figure 7:
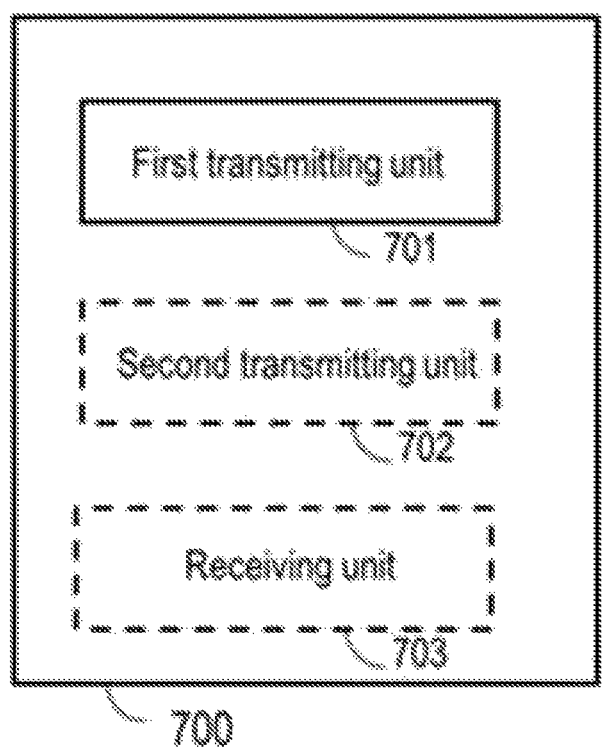
FIG. 7 illustrates an example structural diagram of a further apparatus for data migration according to an embodiment of the present disclosure.

FIG. 7 illustrates a schematic structural diagram of another apparatus 700 for data migration. The apparatus may be implemented for example in a source storage device or in a device separate from the source storage device.

As illustrated in FIG. 7, the apparatus 700 comprises a first transmitting unit 701 configured to transmit a data migration request to a data migration device; the data migration device comprises any apparatus 400 or 500 described in conjunction with FIG. 4 or FIG. 5.

In one embodiment, as discussed in conjunction with FIG. 4 or FIG. 5, the data migration request may comprise an indication of a source address and a target address for data migration, and information about at least one of the following items: performance requirement for the data migration, whether deleting duplications being required in the data migration, whether to perform compression during the data migration and/or the supported compression format; whether to perform encryption in the data migration and/or the supported encryption manner.

In another embodiment, the apparatus 700 may further comprise: a second transmitting unit 702 configured to transmit, to the data migration device at least one of: a query for a running state, running log of the data migration, a query for the running log, and to-be-migrated data.

In a further embodiment, the apparatus 700 may further comprise a receiving unit 703 configured to receive, from the data migration device, a running state and/or a running log of data migration.

As can be understood by those skilled in the art, the apparatuses 400, 500, and 700 may also comprise other units not shown in FIGS. 4, 5, and 7; and/or, in some embodiments, some units in FIGS. 4, 5, and 7 may be omitted.

Before the methods and apparatuses according to the embodiments of the present disclosure are proposed, a uniform data migration solution for various kinds of data formats and application scenarios or processing requirements does not exist. Embodiments of the present disclosure provide a flexible architecture with a centralized control plane and a pluggable data plane, such that the data migration solution is easy to use and scale and is open to new data migration technologies. Moreover, according to embodiments of the present disclosure, a data migration executing unit may also be automatically matched for a data migration task, such that complex internal operations may be hidden from the user, and thereby reducing errors and being adapted to different user demands and application scenarios.

Those skilled in the art will easily appreciate that the blocks or steps in various methods above may be performed through a programming computer. In the present disclosure, some embodiments are also intended to cover a computer program including instructions which, when being executed in at least one processor, cause the at least one processor to perform any one of method 100, method 200 or method 300. In the present disclosure, some embodiments are also intended to cover a program storage system, e.g., a digital data storage medium, which includes a machine or computer-readable, and encoding machine-executable or computer-executable instruction program, wherein the instruction performs some or all steps in the method 100, 200 or 300. The program storage system may be, e.g., a digital memory, a magnetic storage medium such as a magnetic disk and a magnetic tape, a hardware driver, or an optical readable digital data storage medium. Embodiment is also intended to cover a computer programmed to execute the steps of the methods above. Some embodiments are also intended to cover an apparatus that comprises at least one processor; and at least one memory including a computer program code, wherein the at least one memory and the computer program code are configured to: with the at least one processor, cause the apparatus to perform any method of method 100, method 200 or method 300.

Figure 8:
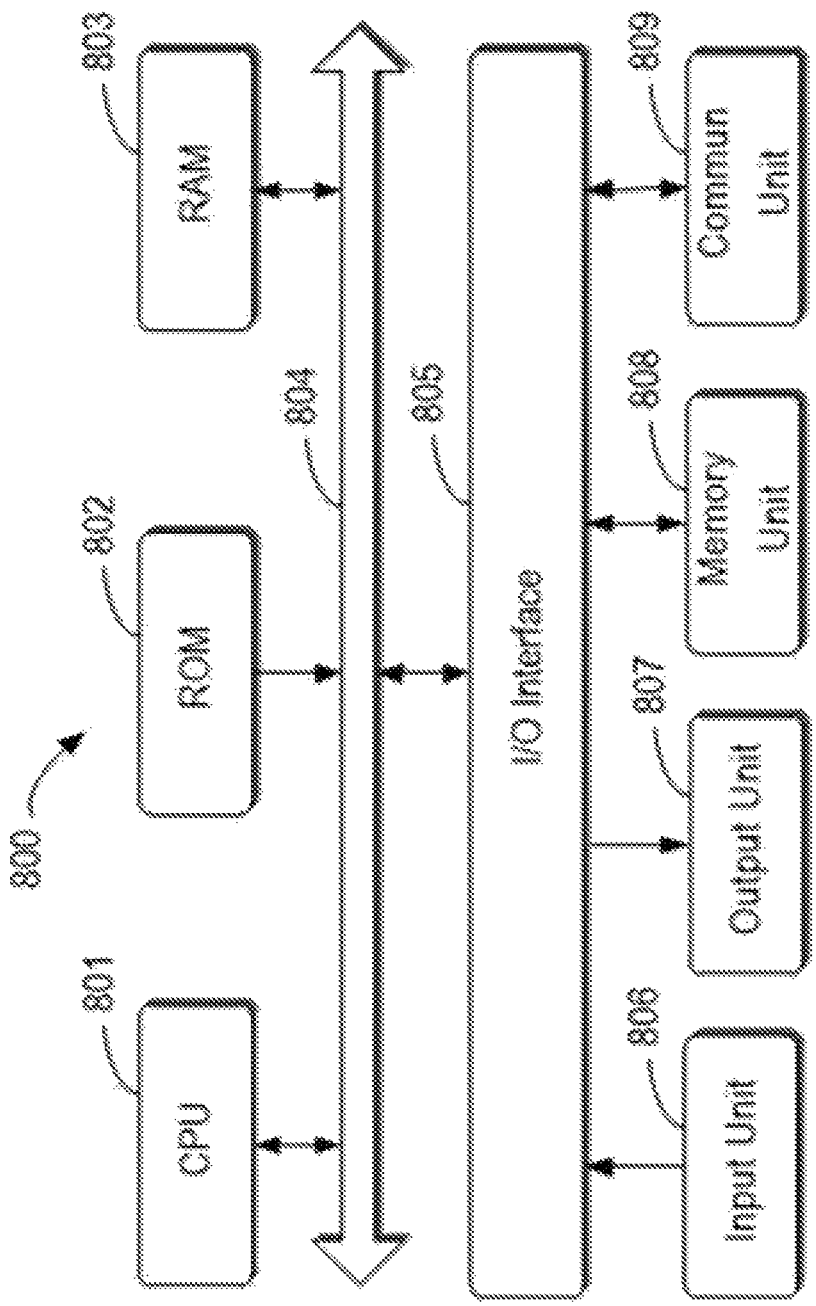
FIG. 8 illustrates a schematic block diagram of an example device for implementing an embodiment of the present disclosure.

FIG. 8 illustrates a schematic block diagram of an apparatus 800 that may be used to implement an embodiment of the present disclosure. As illustrated in the figure, the apparatus 800 comprises a processing unit (for example, CPU, but not limited thereto) 801 which may perform various appropriate actions and processing according to the computer program instructions stored in a read-only memory (ROM) 802 or computer program instructions from a memory unit 808 (for example, the computer program instructions loaded in the random access memory (RAM) 803 from the memory unit 808). Various programs and data needed by operations of the storage device 800 may be stored in RAM 803. The processing unit 801, ROM 802, and RAM 803 are connected with each other via a bus 804. The input/output (I/O) interface 805 is also connected to the bus 804.

A plurality of components in the apparatus 800 are connected to the I/O interface 805, comprising: an input unit 806 such as a keyboard, a mouse; an output unit 807 such as various types of displays and loudspeakers; a memory unit 808 such as a magnetic disc, an optical disc; and a communication unit 809 such as a network card, a modem, and a radio communication transceiver. The communication unit 809 allows the apparatus 800 to exchange information/data with other devices via a computer network such as Internet and/or various telecommunications network.

Various processes and processing described above, e.g., method 100, 200 or 300, may be performed by the processing unit 801. For example, in some embodiments, the method 100, 200 or 300 may be implemented as a computer software program that is tangibly embodied on the machine readable medium, e.g., the memory unit 808. In some embodiments, part or all of the computer program may be loaded and/or installed onto the apparatus 800 via ROM 802 and/or communication unit 809. When the computer program is loaded in the RAM 803 and executed by the processing unit 801, one or more steps of the method 100, 200 or 300 as described above may be executed.

Therefore, the solutions of the present disclosure may be provided in various manners. For example, in some embodiments, the method/apparatus of the embodiments may be implemented as a hardware box or an encapsulated device combining software and hardware; in some other embodiments, the methods/apparatuses of the embodiments may be implemented as software products running on commercial hardware; in some further embodiments, the methods/apparatuses of the embodiments may be provided as a service to the user in a cloud environment.

The functions of various elements of the apparatus illustrated in the accompanying drawings may be provided by software, customized hardware, and hardware associated with appropriate software and capable of executing software, or firmware, or a combination thereof. When provided by a processor, the function may be provided by a single specific processor, a single shared processor, or a plurality of individual processors. Besides, the term "processor" may include, but not limited to, a digital signal processor (DSP) hardware, a network processor, an application-specific integrated circuit (ASIC), a field programmable gate array (FPGA), a read-only memory (ROM) for storing software, a random access memory (RAM) and a non-volatile storage device. It may also comprise other convention and/or customized hardware.

Those skilled in the art should understand that the specification and the drawings only illustrate the principle of the embodiments of the present disclosure. Therefore, it should be understood that those skilled in the art can design various kinds of arrangements which, although not explicitly described or illustrated here, embody the principle of the embodiments of the present disclosure and are included within the spirit and scope of the embodiments of the present disclosure. Besides, all examples illustrated herein are mainly intended explicitly for teaching purposes so as to help readers to understand the principle of the embodiments of the present disclosure and the concepts contributed by the inventors for advancing the field, and should be explained as not being limited to the examples and conditions of these specific illustrations. Moreover, the principle and aspects of the embodiments of the present disclosure illustrated herein and all explanations of the embodiments as well as specific examples are also intended to cover their equivalents.

We claim:

1. A method for data migration, comprising:
   registering at least one executing unit for data migration, each of the at least one executing unit corresponding to a description file;
   extracting and storing information contained in the description file corresponding to each of the at least one executing unit;
   receiving a data migration request from a user, wherein the data migration request includes an indication of a source address and a target address for data migration, and information about a performance requirement for the data migration;
   in response to the data migration request from the user, selecting an executing unit for data migration of the user at least based on part of the stored information contained in the description file;
   scheduling an instance of the selected executing unit to perform the data migration of the user;

monitoring a performance of the instance of the selected executing unit, wherein monitoring the performance of the instance of the selected executing unit includes:
    detecting at least one of a failure of the instance of the selected executing unit and a performance abnormality of the instance of the selected executing unit;
    upon detecting the failure of the instance of the selected executing unit, at least one of re-starting the instance of the selected executing unit, and killing the instance of the selected executing unit and applying a new resource to replace the instance of the selected executing unit upon which the failure was detected; and
    upon detecting a performance abnormality of the instance of the selected executing unit, at least one of launching one or more instances of the selected executing unit on an existing resource, and increasing an amount of resources being applied from a resource pool, the launching of the one or more instances of the selected executing unit and increasing of the amount of resources being respective to a degree of degradation associated with the performance abnormality;
transmitting a data migration response to the user; and
receiving, from the user, a query for at least one of a running state and a running log of the data migration.

2. The method according to claim 1, wherein each of the at least one executing unit is encapsulated into a container.

3. The method according to claim 1, wherein the description file indicates at least one of the following of a corresponding executing unit:
    a type,
    a capacity,
    a configuration,
    a supported data format,
    a running requirement, and
    a supportable performance.

4. The method according to claim 1, wherein the data migration request further includes information about at least one of:
    whether deleting duplications is required during the data migration,
    whether to perform at least one of compression during the data migration and a supported compression format, and
    whether to perform at least one of encryption during the data migration and a supported encryption manner.

5. The method according to claim 1, wherein one of the at least one executing unit is further configured to execute at least one of: data extracting, data buffering, data checking, duplicate data deleting, data compressing, data encrypting, and data transmitting.

6. The method according to claim 1, wherein selecting an executing unit for data migration of the user at least based on part of the stored information contained in the description file comprises:
    analyzing the data migration request from the user; and
    determining an executing unit matching the data migration request based on the analyzing and the part of the stored information contained in the description file.

7. The method according to claim 6, wherein selecting an executing unit for data migration of the user at least based on part of the stored information contained in the description file further comprise:
    determining, as a most matching executing unit, an instance of a running executing unit from executing units matching the data migration request.

8. The method according to claim 6, wherein selecting an executing unit for data migration of the user at least based on part of the stored information contained in the description file further comprises:
    evaluating resources required for running of the executing unit; and
    determining an executing unit matching the data migration request further based on the evaluating.

9. The method according to claim 1, further comprising at least one of:
    displaying at least one of the running state and the running log of the data migration of the user, in response to the query from the user; and
    receiving, from the user, data to be migrated.

10. The method according to claim 1, further comprising:
    updating at least one of a progress, a state, a log, a resource usage, and a performance of the scheduled instance of the selected executing unit.

11. The method according to claim 10, further comprising:
    monitoring at least one of a progress, a state, a log, and a resource usage of the scheduled instance of the selected executing unit; and
    increasing, reducing, or changing the scheduled instance of the selected executing unit based on the monitoring.

12. A method for data migration, comprising:
    transmitting a data migration request to a data migration device configured to perform data migration, wherein the data migration request includes an indication of a source address and a target address for the data migration, and at least one of the following information:
        a performance requirement for the data migration,
        whether deleting duplications is required during the data migration,
        whether to perform at least one of compression during the data migration and a supported compression format, and
        whether to perform at least one of encryption during the data migration and a supported encryption manner;
    selecting an executing unit for the data migration from the data migration device at least based on part of the stored information contained in a description file;
    scheduling an instance of the selected executing unit to perform the data migration from the data migration device;
    monitoring a performance of the instance of the selected executing unit, wherein monitoring the performance of the instance of the selected executing unit includes:
        detecting at least one of a failure of the instance of the selected executing unit and a performance abnormality of the instance of the selected executing unit;
        upon detecting the failure of the instance of the selected executing unit, at least one of re-starting the instance of the selected executing unit, and killing the instance of the selected executing unit and applying a new resource to replace the instance of the selected executing unit upon which the failure was detected; and
        upon detecting a performance abnormality of the instance of the selected executing unit, at least one of launching one or more instances of the selected executing unit on an existing resource, and increasing an amount of resources being applied from a resource pool, the launching of the one or more instances of the selected executing unit and increasing of the amount of resources being respective to a degree of degradation associated with the performance abnormality;

transmitting a data migration response to the user; and receiving, from the user, a query for at least one of a running state and a running log of the data migration.

13. The method according to claim 12, further comprising:

receiving, from the data migration device, at least one of a running state and a running log of the data migration.

14. An apparatus for data migration, comprising a registering unit, a storing unit, a first receiving unit, a second receiving unit, a scheduling unit, a monitoring unit, a first transmitting unit, and at least one executing unit, wherein:

each of the at least one executing unit corresponds to a description file in a predefined format, and each executing unit is configured to perform data migration when being scheduled by the scheduling unit;

the registering unit is configured to register the at least one executing unit;

the storing unit is configured to extract and store information contained in the description file corresponding to each of the at least one executing unit;

the first receiving unit is configured to receive a data migration request from a user, wherein the data migration request includes an indication of a source address and a target address for data migration, and information about a performance requirement for the data migration;

the scheduling unit is configured to, in response to the data migration request from the user, select an executing unit for data migration of the user at least based on part of the stored information contained in the description file, and schedule an instance of the selected executing unit to perform the data migration of the user;

the monitoring unit is configured to monitor a performance of the instance of the selected executing unit, detect at least one of a failure of the instance of the selected executing unit and a performance abnormality of the instance of the selected executing unit and, upon detecting the failure of the instance of the selected executing unit, at least one of re-start the instance of the selected executing unit, and kill the instance of the selected executing unit and apply a new resource to replace the instance of the selected executing unit upon which the failure was detected, and upon detecting a performance abnormality of the instance of the selected executing unit, at least one of launch one or more instances of the selected executing unit on an existing resource, and increase an amount of resources being applied from a resource pool, the launch of the one or more instances of the selected executing unit and increase of the amount of resources being respective to a degree of degradation associated with the performance abnormality;

the first transmitting unit is configured to transmit a data migration response to the user; and the second receiving unit is configured to receive, from the user, a query for at least one of a running state and a running log of the data migration.

15. The apparatus according to claim 14, wherein each of the at least one executing unit is encapsulated into a container.

16. The apparatus according to claim 14, wherein the description file indicates at least one of the following of a corresponding executing unit:

a type,
a capacity,
a configuration,
a supported data format,
a running requirement, and
supportable performance.

17. The apparatus according to claim 14, wherein the data migration request further comprises information about at least one of:

whether deleting duplications is required to during the data migration, whether to perform compression during at least one of the data migration and a supported compression format, and whether to perform at least one of encryption during the data migration and a supported encryption manner.

18. The apparatus according to claim 14, wherein one of the at least one executing unit is further configured to execute at least one of: data extracting, data buffering, data checking, duplicate data deleting, data compressing, data encrypting, and data transmitting.

19. The apparatus according to claim 14, wherein the scheduling unit is further configured to:

analyze a data migration request from the user, determine an executing unit matching the data migration request based on the analyzing and the part of the stored information contained in the description file, and schedule an instance of the determined executing unit to perform the data migration.

* * * * *